United States Patent [19]  [11] 4,209,006
Marsalko  [45] Jun. 24, 1980

[54] BARBECUE UNIT
[76] Inventor: Stephen C. Marsalko, 19430 Erhart Rd., Medina, Ohio 44256
[21] Appl. No.: 861,679
[22] Filed: Dec. 19, 1977
[51] Int. Cl.² .......................................... A47J 37/00
[52] U.S. Cl. .................................................. 126/25 R
[58] Field of Search ...................................... 126/25 R
[56] References Cited
U.S. PATENT DOCUMENTS

| 2,691,368 | 10/1954 | Hood | 126/25 |
|---|---|---|---|
| 2,727,505 | 12/1955 | Hood | 126/25 R |
| 2,983,269 | 5/1961 | Montesano | 126/25 R |
| 3,326,201 | 6/1967 | Murray | 126/25 R |
| 3,868,943 | 3/1975 | Hottenroth et al. | 126/25 R |
| 3,933,145 | 1/1976 | Reich | 126/25 R |
| 3,982,522 | 9/1976 | Hottenroth et al. | 126/25 R X |

FOREIGN PATENT DOCUMENTS 2616499 10/1977 Fed. Rep. of Germany ........ 126/25 R

Primary Examiner—Samuel Scott
Assistant Examiner—Wesley S. Ratliff, Jr.

[57] ABSTRACT

An improved barbecue unit utilizing a set of controllable louvered openings and a set of uncontrollable openings in combination with a forced air draft device for directing air through the louvered openings and onto the substance being barbecued, with the directed air being directed to the uncontrollable openings by a partial vacuum created by the forced air device and redirected through the louvered openings at a preheated temperature at the substance being barbecued.

1 Claim, 2 Drawing Figures

BARBECUE UNIT

BACKGROUND OF THE INVENTION

1. Field of the Invention

The invention relates to a barbecuing unit, especially for outside use in which preheated air is continually circulated over the food being barbecued and also the fuels being utilized, while the cooking process is being performed. The barbecue unit utilizes louvered openings for controlling the amount of passing air and for controlling the degree of air deflection. The barbecue unit further incorporates continuous air passages for redirecting the preheated air over the food and fuel.

2. Description of the Prior Art

The prior art is replete with inventions relating to barbecue apparatus, grills, stoves, etc., which utilize forced air and it would be appropriate to discuss representative examples at this time.

U.S. Pat. No. 2,691,368 (126-25) to A. J. Hood discloses a barbecue unit which utilizes a regulated forced draft to simplify the igniting process and is also used to some extent during the cooking process.

U.S. Pat. No. 2,727,505 (126-25) to A. J. Hood discloses a portable insulated barbecue unit which utilizes a regulated forced draft in the same manner as disclosed in U.S. Pat. No. 2,691,368.

U.S. Pat. No. 2,983,269 (126-25) to Montesano discloses a barbecue stand for barbecuing food both indoors and outdoors. The invention utilizes forced draft means for both ease in igniting the fuel and the cooking process.

U.S. Pat. No. 3,326,201 (126-25) to Murray discloses a mechanically complex barbecue apparatus which also utilizes forced draft means during the cooking process.

However, none of the above cited art nor any art discovered discloses a barbecue unit in which a forced air draft is directed onto the fuel substance in a substantially closed circuit and reused in a pre-heated state which results in the utilization of less fuel, more heat and greater efficiency.

The applicant submits that the only art which would be pertinent in accordance with the principles of his invention is a disclosure document filed by the applicant, U.S. Pat. No. 031,318, of which this invention is an improvement thereby.

SUMMARY OF THE INVENTION

Objectives of the invention include providing a highly efficient simple mechanical structure to be used for barbecuing food substances utilizing the continuous recycling of preheated air over the food and ignited fuel for producing a hotter heat with less fuel.

BRIEF DESCRIPTION OF THE DRAWINGS

The invention will be more fully understood from the following description of the drawings when considered in connection with the accompanying drawings which illustrate the best mode in which the applicant contemplates carrying out the principles of his invention and in which like numbers refer to like parts in the drawings.

DESCRIPTION OF THE PREFERRED EMBODIMENT

Figures 1, 2:
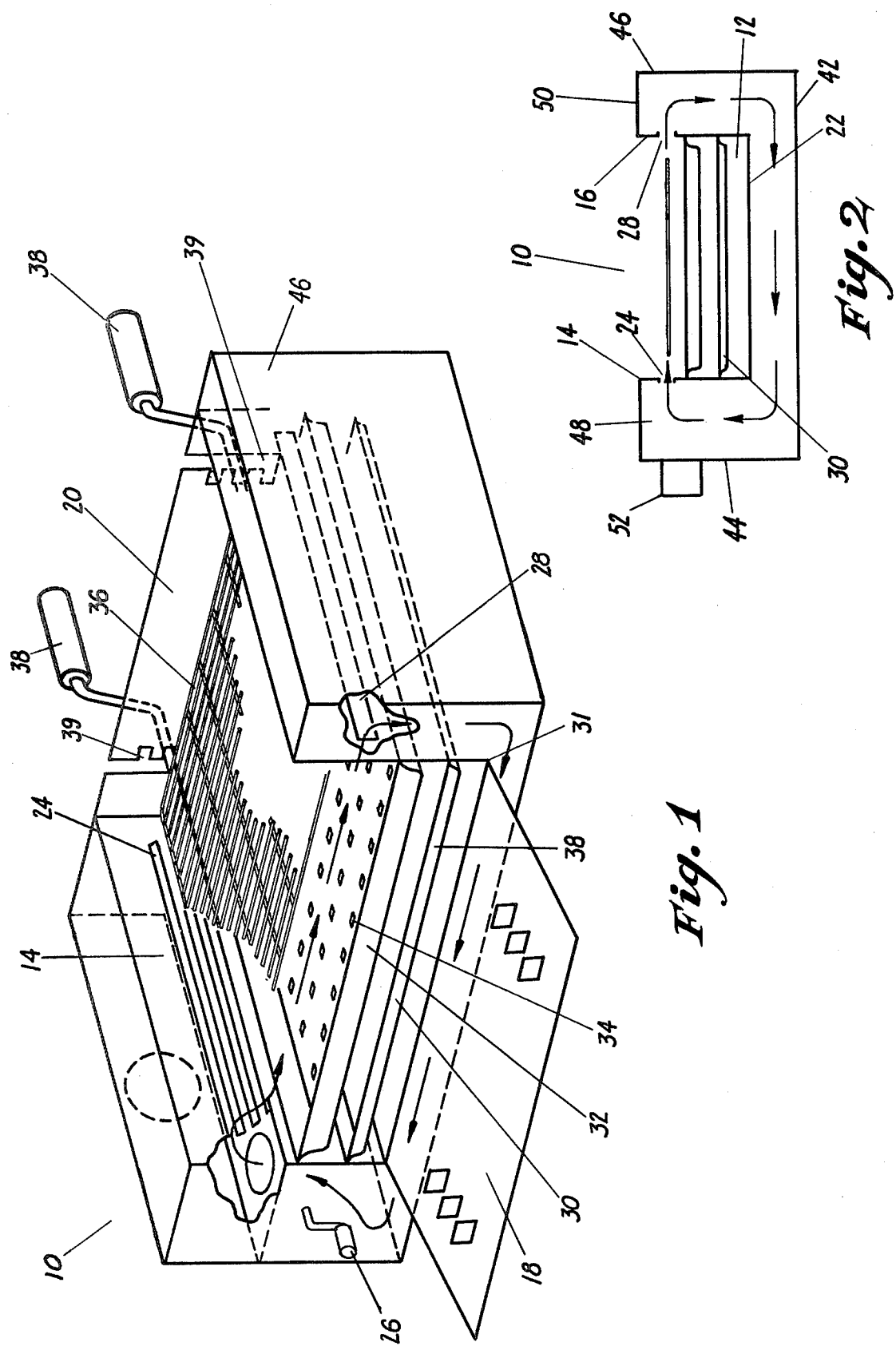
FIG. 1 is a perspective and partial sectional view of the invention.
FIG. 2 is a front view of the invention illustrating the air flow.

The improved barbecue unit is indicated generally at 10 and shown in FIGS. 1 and 2 and formed preferably of steel, cast iron or other high temperature resistant metals. A rectangular combustion chamber 12 is shown open on top, and closed at five sides by side walls 14 and 16, front wall 18, back wall 20 and bottom wall 22.

The side wall 14 is provided with a plurality of louvers 24, whereby said opening and closing of the louvers is conventionally performed by means well known to those skilled in the art by lever means 26. The side wall 16 is provided with a plurality of openings 28, lying in the same plane formed as that of the louvers. It is noted at this time that the number of openings 28, for optimum efficiency should be equal in number to the louvers 24. However, the unit would operate satisfactorily where the number of openings 28, is either more or less than the number of louvers, 24.

Positioned on top of bottom wall 22 within the combustion chamber 12 is a channel shaped ash drawer 30 for receiving expended ash materials. In that light, ash drawer 30 may be slidingly removed for emptying by lowering front wall 18 and sliding the ash drawer 30 out. Obviously, this would necessitate affixing front wall with some type of hinge means, not shown. However, the wall 18 could be permanently fixed, which would require removing the ash drawer 30 from the top, which will be obvious, simply by removing the top hardware.

Also positioned within the combustion chamber 12 and on top of the ash drawer 30 is a rectangular fire plate 32 having a plurality of openings 34, said fire plate utilized to hold the fuel while burning and allowing the ashes created by the combustion process being directed to the ash drawer via the fire gate openings 34.

Also movably positioned within the combustion chamber 12 is grill 36 which holds the food to be cooked. Affixed to the grill 36 are handles 38 which are utilized to lower or raise the grill within the combustion chamber 12, depending on the needs of the cook. The handles are held by slots 39 on the back wall 26 for retaining the grill 36 at a desired distance from the heat generating source.

Back of the wall 14 is another wall 44, back of side wall 16 is another wall 46 and below bottom wall 22 is another wall 42, with walls 14 and 44 joined at the top by a wall 48 and walls 16 and 36 joined at the top by wall 50. The walls just mentioned provide an enclosed air chamber of U-type construction more or less, for the containment of air whose purpose shall be described shortly. In addition, wall 44 is provided with an opening for receiving a conventional blower for creating a forced draft.

In the operation of barbecue unit 10, the combustion chamber is filled with a fuel such as charcoal by placing the charcoal on fire plate 32 and ignited by conventional means and the substance to be cooked is placed on the grill 36. The blower 52 is energized which causes air to flow out through the louvers 24 across the combustion chamber 12 and over the ignited fuel and food and into the openings 28. The blower 52 causes a partial vacuum to be formed in the U-shaped air jacket which results in the capture of a substantial portion of the air exit via the louvered openings 24. The air captured at openings 28 is thus directed back to the blower means 52 and again redirected across the combustion chamber 12. It can be seen that this recirculated preheated air would result in hotter heats with less fuel, or in other words, tremendously increased combustion. The degree of louvered opening determines the amount of air to pass through and to the angle at which the air is directed across the combustion chamber 12.

In the prior art, the heated air was not recycled resulting in heat waste. Utilizing this normally wasted heat results in tremendous energy savings. The rate of combustion is easily controlled by the speed of the blower 52 and the amount of openings at 24. Thus, the improved barbecue unit eliminates substantially great losses of heat and provides a simple, efficient barbecue unit.

The description contained herein is one means by which the invention may be carried out, and the scope of the claims need not be limited to the construction specifically illustrated and described unless required by the prior art.

I claim:

1. A barbecue unit comprising:

- a U-shaped air chamber defining a combustion chamber;
- a plurality of elongated first and second openings formed on said U-shaped air chamber walls such that said first and second openings lie in the same plane and face each other, said first opening being provided with Louvers for controlling the size of said first openings;
- a vertically adjustable grill disposed within the U-shaped air chamber;
- grate means for retaining hot coals and disposed within said U-shaped air chamber and in a plane parallel to the plane defined by said first and second openings;
- front and back walls for enclosing the U-shaped air chamber at the sides; and
- blower means for creating a partial vacuum and directing air through said first set of controlled openings, across said combustion chamber and into said second set of openings; said directed air being redirected to said first set of controlled openings via said U-shaped air chamber.

* * * * *